Jan. 19, 1965 J. W. C. BABB 3,166,639

NOISE ELIMINATING CIRCUITS

Filed Feb. 9, 1960

INVENTOR.
JAMES WILBUR C. BABB
BY ATTORNEYS
MORGAN, FINNEGAN
DURHAM & PINE

United States Patent Office 3,166,639
Patented Jan. 19, 1965

3,166,639
NOISE ELIMINATING CIRCUITS

James Wilbur C. Babb, deceased, late of McAlester, Okla., by Tom E. Garrard, executor, 209 E. Wyandotte, McAlester, Okla.

Filed Feb. 9, 1960, Ser. No. 7,562
1 Claim. (Cl. 179—1)

This invention relates to means for eliminating noise interference and the like in electronic systems and more particularly to circuits of unilateral elements having noise-limiting or noise-suppressing characteristics.

The elimination of noise has occupied the communication art since the advent of radio broadcasting. In its earliest manifestations noise comprised interference with or corruption of the desired signal by spurious impulses originating in natural phenomena such as static, lightning, and magnetic storms, and/or in random electrical activity inherent in the electrical components of the communication system, e.g., tube noise and resistor noise. As electrical machinery and power distribution developed, another source of noise appeared. The problem was further compounded as the number of communication systems multiplied both in number and type, this growth creating the problem of interference among stations in one system and among different systems (AM, FM, TV, etc.).

The reduction of noise has been rigorously undertaken by the art with varying degrees of success. In general, improvements have been effected by increasing signal strength relative to the level of noise (high $S/N$ ratio), by employing techniques having certain inherent immunities from noise (FM), by developing system components having low inherent noise, by narrowing the band-pass of systems, by shielding vulnerable components and circuits, by including in the design of electrical machinery certain features which minimize their capacity for noise generation and radiation and even by selecting low-noise regions of the electro-magnetic spectrum (VHF, UHF, etc.).

While great strides have been made in providing noise-free communication, one merely has to turn on an AM broadcast receiver during a storm or while the thermostatic control of a heating system is cycling, to appreciate that the problem is far from solved. This appreciation is heightened if an unshielded automobile engine or fluorescent lamp is operating in the vicinity.

The present invention is concerned with noise interference as it is manifested, for example, in the loudspeaker output of an audio system associated with a communication receiver, or with a phonographic reproducer, and is particularly applicable to that type of noise which is characterized by the existence of amplitude-modulating impulses which usually, though not exclusively, have frequency components in the upper region of the audio system's band-pass. Although such noise has, in general, been substantially reduced by the aforementioned techniques, it is nevertheless a persistent problem. If noise, notwithstanding the use of quality components, high selectivity, shielding and the like, succeeds in corrupting audio signals, there is at present no known method of completely eliminating it. Tuned noise filters and the like, inserted in the audio system, may be effective in reducing the noise to the extent that it is most pronounced in the upper region of the audio spectrum but these arrangements also filter the high-frequency components of the desired signal and thus inevitably introduce distortion.

It is also known to employ limiter type circuits for reducing the effects of noise. These circuits are designed into the internal circuits of the receiver, audio system or the like, being arranged to cooperate with intermediate stages of the system such as IF amplifiers and second detectors. These circuits moreover frequently require biasing and supply voltages, thereby multiplying the number of circuit connections involved in integrating the noise circuit into the system. Some limiters also require batteries, switches and potentiometers in their circuits.

It is evident that the above-described limiter circuits would not be satisfactory as self-contained noise limiting arrangements capable of being used, for example, in the form of a kit which could be installed in a pre-existing system by a person lacking technical skills. The multiplicity of connections and the fact that connecting points could not be easily identified or are inaccessible, preclude present limiter circuits from such an application. It would be impossible, for example, to expect the average lay person to install a five or six-terminal noise limiter in the second detector stage of his AM receiver. The need for batteries, switches, potentiometers and the like also tend to eliminate the applicability of present circuits to this type of use. Moreover, known limiters are generally tailor-made to a specific application, i.e., to a specific stage of a specific type of receiver. They are accordingly incapable of wide use in varied electronic units. Tuned noise filters on the other hand can be readily designed for use in kit form by the technically unskilled. As noted above however, these circuits, to be effective in eliminating noise in the spectrum of interest, must distort the intelligence in the spectrum, removing it along with the noise.

In contrast, the present invention provides noise limiting circuits which are capable of effectively reducing noise without at the same time introducing distortion, circuits which are of a self-contained character, have but a few terminals and are simply connected to easily identified points in the system to be modified. The embodiments of the invention can also be readily integrated into the initial design of a system. Although all of the noise is not eliminated in practicing the techniques of the invention, a substantial reduction is effected. Significantly, the reduction lies in that area in which the noise is most discernible and annoying to the listener.

It is accordingly a specific object of the invention to provide circuits having noise-limiting characteristics.

It is another object of the invention to provide circuits having noise-limiting characteristics which do not introduce distortion.

A further object of the invention is to provide such circuits which are capable of being supplied in a kit form adapted to modify pre-existing units.

A still further object of the invention is to provide such circuits which may be readily constructed from few and simple components.

It is another object of the invention to provide such a circuit which requires no additional manual adjustment, employs inherently durable, reliable, inexpensive components and can be simply fabricated.

These and other objects and advantages of the invention will be set forth in part hereinafter and in part will be obvious herefrom, or may be learned by practice with the invention, the same being relaized and attained by means of the instrumentalities and combinations pointed out in the appended claim.

The invention consists in the novel parts, constructions, arrangements, combinations and improvements herein shown and described.

By way of illustrating the techniques of the invention exemplary embodiments are herein described and illustrated in the drawings.

Figure 1:
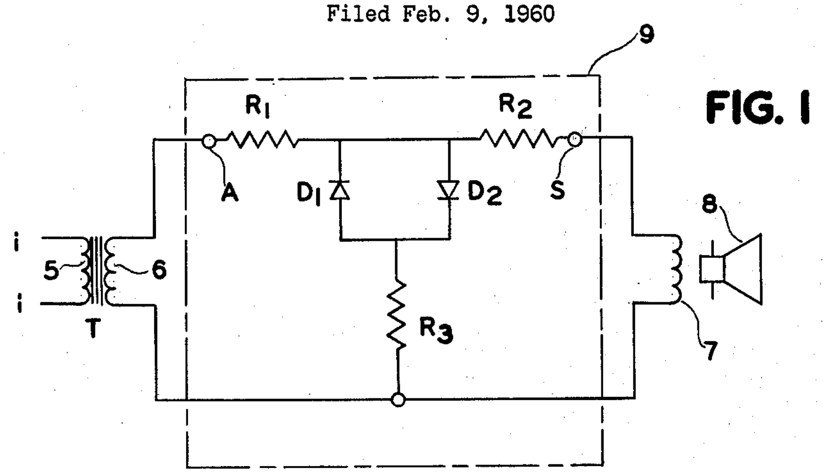
FIGURE 1 is a schematic diagram of one embodiment of the invention.

The circuit illustrated in FIGURE 1, insofar as its input and output are concerned, is representative of a typical final-stage, audio circuit. Thus, audio-frequency signals are applied, in a single-ended or push-pull mode to terminals *i—i* of transformer T, in this way energizing the primary winding 5 thereof. The resultant audio voltage induced in secondary winding 6 is ultimately effective in energizing voice coil 7 of loudspeaker 8. To modify the output stage so as to include the noise limiting circuit of the invention, there is interposed between transformer T and loudspeaker 8 a circuit 9 having input terminal A, output terminal S and common input-output terminal C. It may be noted here that no auxiliary signal or power inputs are required. Circuit 9 is simply interposed in the leads that normally connect transformer T to speaker 8.

Connected in shunt across the input and output is a pair of unilateral elements, $D_1$ and $D_2$. It has been found that these elements, in order to meet the requirements of the limiter circuits, should have certain characteristics which are provided by silicon diodes, and these are accordingly preferred. The rectifiers are oppositely polarized and connected across the circuit such that at some predetermined input potential, the rectifiers conduct on alternate cycles, thus diverting, during the conduction periods, currents which would normally flow through the voice coil 7 of speaker 8. If the threshold sensitivity of rectifiers $D_1$ and $D_2$ (e.g. 0.6 volt) is higher than the peak amplitude of the audio signal, but lower than peak values of the noise signal, then the rectifiers or diodes will conduct on alternate half cycles during the period when the noise signals have an amplitude greater than the threshold sensitivity of the diodes. The shunt action thus provided diverts from the speaker system those components of the noise which are most discernible, and consequently most annoying. The audio signals heard emanating from the loud speaker 8 accordingly appear to be substantially free of interference.

For reasons not fully understood, the non-linear characteristic of the silicon rectifiers in the threshold region contributes to this noise reducing characteristic. Thus, the non-linear forward resistance of the rectifiers causes a distortion of the noise waveforms which appears to augment in a favorable manner the basic clipping action provided by the rectifiers' unilateral characteristics. For these and other reasons, silicon diodes or semi-conductors of comparable characteristics are preferred.

In the circuit of FIGURE 1 resistor $R_1$ is interposed serially between the input A, and the shunting diodes, while resistor $R_2$ is serially interposed between the diodes and the output, S. Resistor $R_3$ is inserted in the shunting branch thereby forming a common resistance for both rectifiers $D_1$ and $D_2$. These resistances, designed to provide impedance matching and to control transient loading and the like, are selected in accordance with the amplitude of the audio signals developed across secondary winding 6 of transformer T, in accordance with the characteristics of the diodes $D_1$ and $D_2$, and in accordance with the input and output impedances of the circuit.

Figure 2:
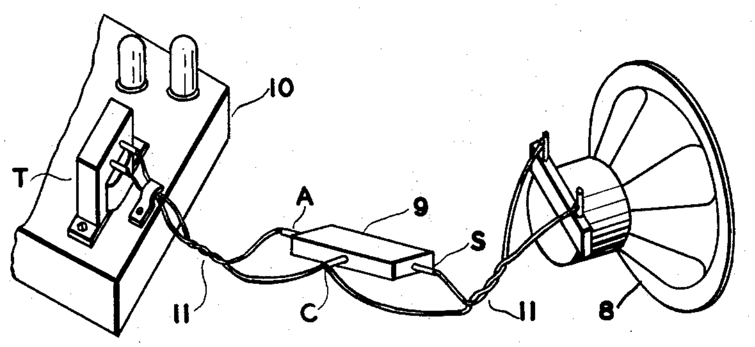
FIGURE 2 is a perspective drawing illustrating certain installation details of one form of the invention.
Figure 3:
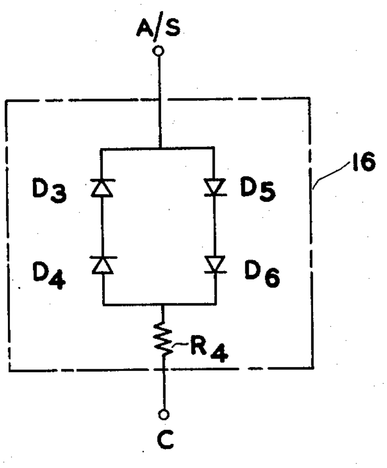
FIGURE 3 is a schematic diagram of another embodiment.

The self-sufficient character of the circuit of FIGURE 1 is evident in FIGURE 2 where a typical installation is shown. This installation may comprise a modification to an audio output system or may be initially included therewith. FIGURE 3 will be described in terms of a modification to equipment which initially comprised a chassis 10 housing various electronic components of a receiver or other system, these components including a transformer T normally connected via cable 11 to a speaker 8. Inclusion in this arrangement of the noise limiting circuit 9 of FIGURE 1 is simply accomplished by cutting cable 11, connecting the speaker end of one lead to terminals S of FIGURE 9, connecting the corresponding chassis end of this lead to terminal A and connecting both the chassis end and speaker end of the other lead to terminal C. The terminals may be of the solder type or can be arranged like Fahnstock clips to eliminate the need for soldering. If both the chassis 10 and the frame of speaker 8 have been originally connected to a common ground frame—in which case cable 11 would have only one lead—then the common terminal C of circuit 9 may be grounded at any convenient place, e.g., the chassis 10 or the frame of the speaker.

The circuit 9 can actually be housed in a casing considerably smaller in size than the one illustrated in FIGURE 2. Accordingly, space problems are eliminated. Moreover, the components embodied in circuit 9 are virtually ageless so that the arrangement can be sealed to form a package which for all intents and purposes is indestructible.

Additionally, little weight is involved so that the physical straining of cable 11 is negligible. It may also be noted here that the points in the system where the circuit 9 is to be added are readily identified even by the technically unskilled since the leads running to the speaker are readily identified.

In known systems where the threshold sensitivity of the preferred diode is not properly suited to the amplitudes and other characteristics of the system's signals, the effective threshold sensitivity is generally adjusted to required levels by including bias voltages. (Resistances in the circuit, such as R–1, R–2 and R–3 in FIGURE 1, do have some effect on the net threshold sensitivity.) For the objects contemplated by the invention this is unsatisfactory in view of the increased space, weight, cost and complexity and in view of the substantial decrease in operating life. The invention accordingly provides means for adjusting the threshold sensitivity in accordance with system requirements without the need for additional bias connections or batteries. There is thus provided, as illustrated in FIGURE 3, a plurality of serially-connected diodes in each shunting branch, diodes $D_3$ and $D_4$ being in one branch and diodes $D_5$ and $D_6$ in the other. This arrangement provides an increase in the effective threshold sensitivity. A decrease may be provided by analogous parallel arrangements. For fine adjustment, series-parallel grouping can be employed.

The circuit of FIGURE 3 also differs from the embodiment of FIGURE 1 in including only a single resistance, serially connected in the common branch. Such an arrangement is satisfactory for many applications and even may be dispensed with for others.

Figure 4:
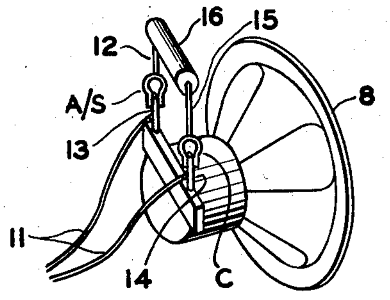
FIGURE 4 is a perspective drawing illustrating alternate installation details.

The circuit 16 of FIGURE 3 requires only two terminals A/S, C. This circuit has the features of durability, compactness and the like that the embodiment of FIGURE 1 enjoys. In addition, circuit 16, as indicated in FIGURE 4, may be installed without the necessity of cutting any cables. Thus, terminals A/S and C, may conveniently comprise resilient clips or the like which are simply clamped on conveniently located output terminals such as terminals 13 and 14 of speaker 8. The wires 12, 15, connecting circuit 16 to terminals A/S, C, can be sufficiently flexible to enable separation of A/S and C to accommodate the separation of terminals 13, 14, the wires 12, 15 having, on the other hand, sufficient rigidity to provide support. It is to be understood, of course, that other methods of physically installing, such as by soldering, are available.

The invention in its broader aspects is not limited to the specific mechanisms shown and described but departures may be made therefrom within the scope of the accompanying claim without departing from the principles of the invention and without sacrificing its chief advantages.

What is claimed is:

An audio output circuit comprising an input transformer energized by a source of audio-frequency current, a loudspeaker, and means for eliminating noise from said loudspeaker consisting essentially of a pair of resistors connected serially from the secondary of said transformer to one side of said loudspeaker, a connection from the secondary of said transformer to the other side of said loudspeaker, and the series combination of a pair of oppositely-polarized, paralleled silicon rectifiers and a resistance, said series combination being connected from the junction of said serially connected resistances to said other side of said loudspeaker said rectifiers having threshold sensitivities greater than signal amplitudes but less than peak noise amplitudes.

References Cited in the file of this patent

UNITED STATES PATENTS

| | | |
|---|---|---|
| 2,173,925 | Tuxen | Sept. 26, 1939 |
| 2,382,848 | Baumgarten | Aug. 14, 1945 |
| 2,703,382 | Cleary | Mar. 1, 1955 |
| 2,785,231 | Chase | Mar. 12, 1957 |
| 2,818,470 | Busala | Dec. 31, 1957 |
| 2,829,282 | Hughes et al. | Apr. 1, 1958 |
| 2,920,291 | Brundage | Jan. 5, 1960 |
| 2,955,171 | Raper | Oct. 4, 1960 |
| 2,964,650 | Radcliffe et al. | Dec. 13, 1960 |
| 2,992,399 | Van Tassel et al. | July 11, 1961 |
| 2,999,173 | Ruck | Sept. 5, 1961 |

OTHER REFERENCES

Toth: Noise and Output Limiters, Part I: Electronics, November 1946, pages 114 et seq.